Figure 9:
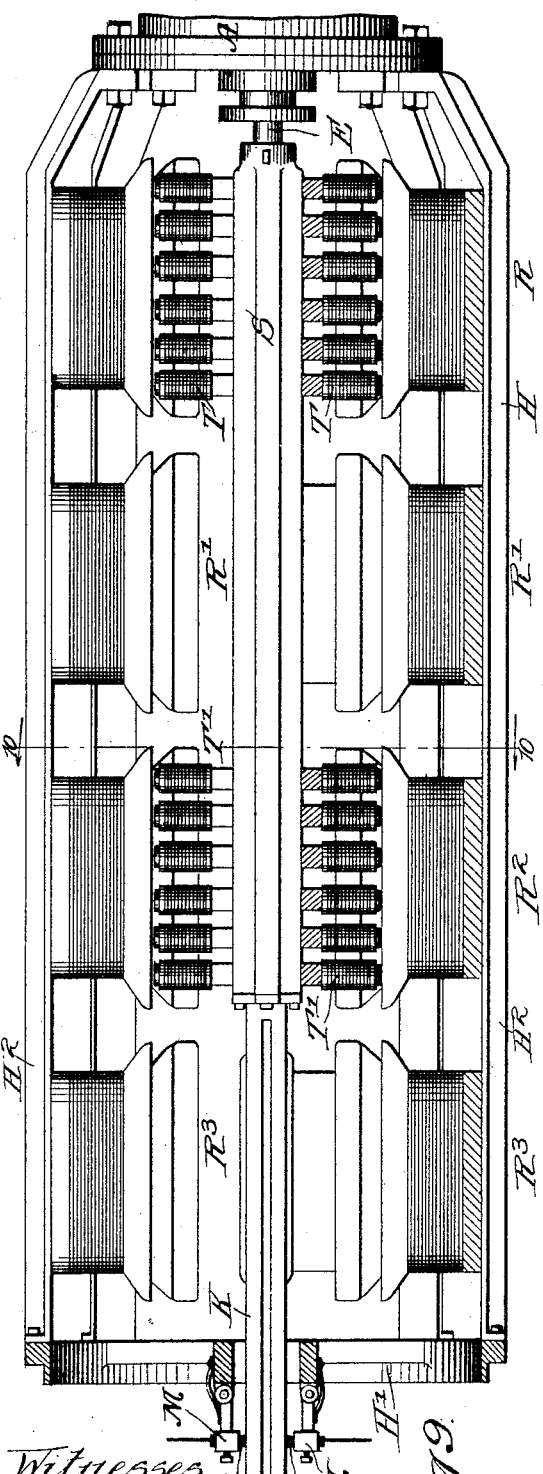

(No Model.)    4 Sheets—Sheet 1.
C. C. POOLE.
ELECTRIC GENERATOR.
No. 581,366.    Patented Apr. 27, 1897.
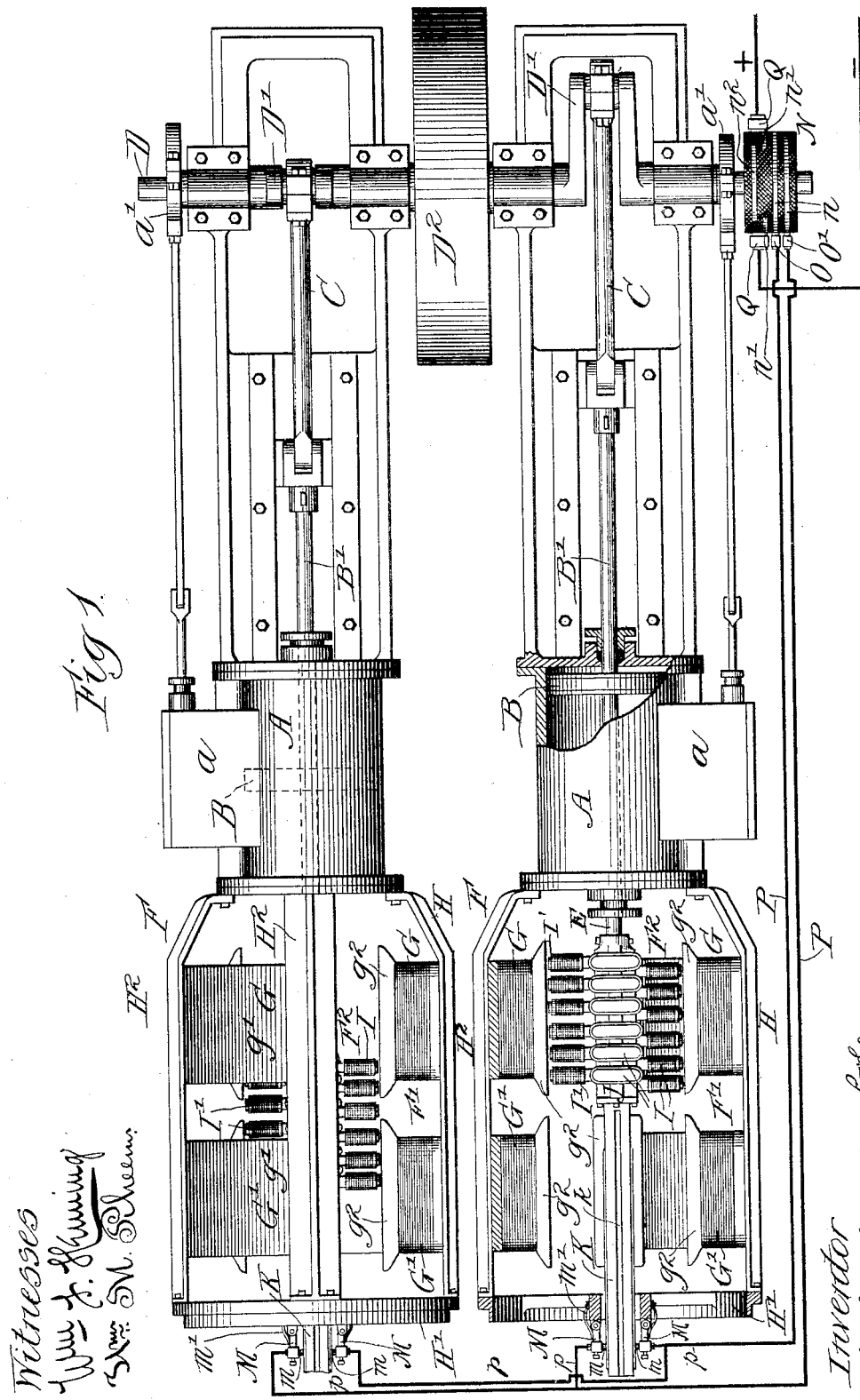

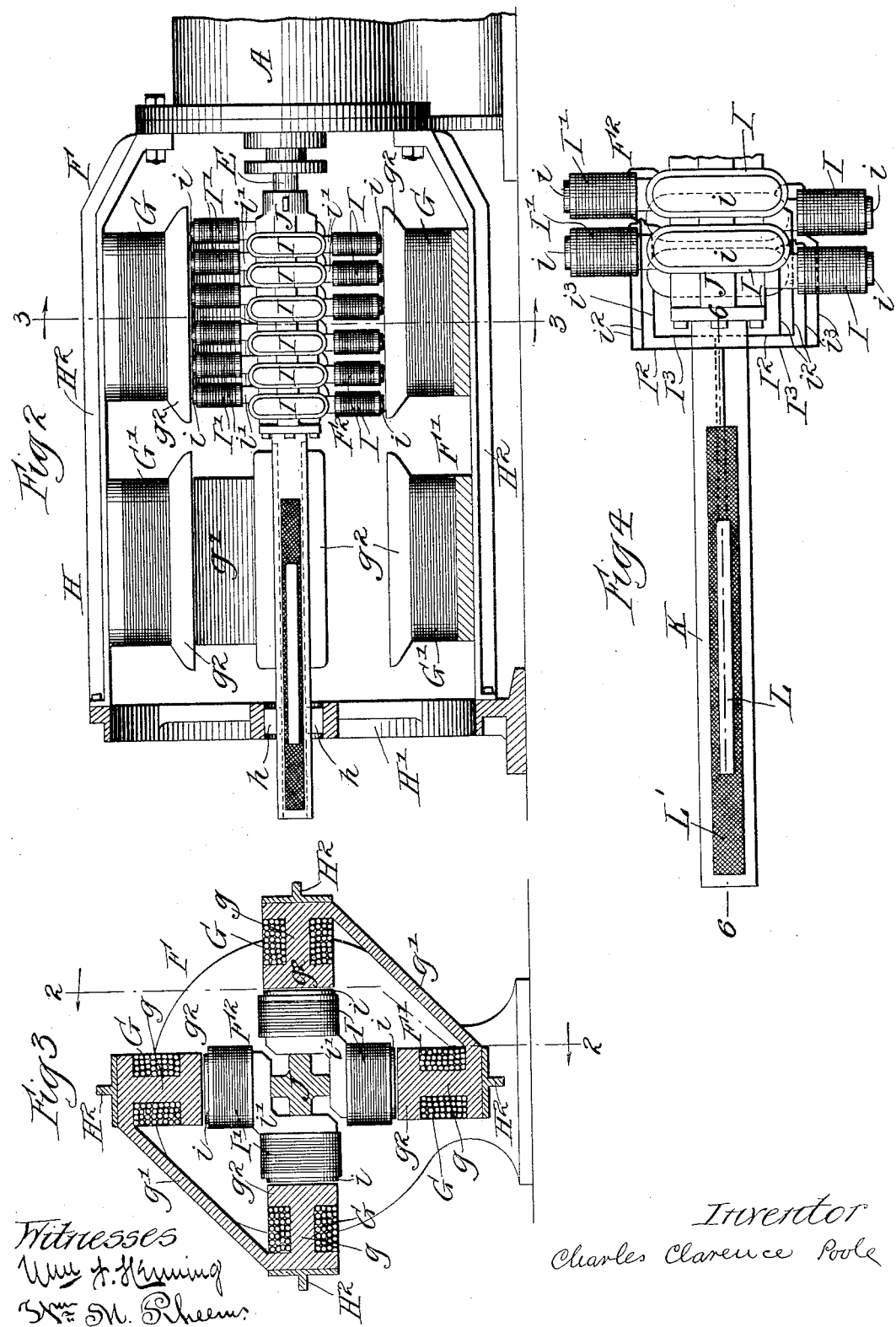

(No Model.) 4 Sheets—Sheet 3.
C. C. POOLE.
ELECTRIC GENERATOR.
No. 581,366. Patented Apr. 27, 1897.
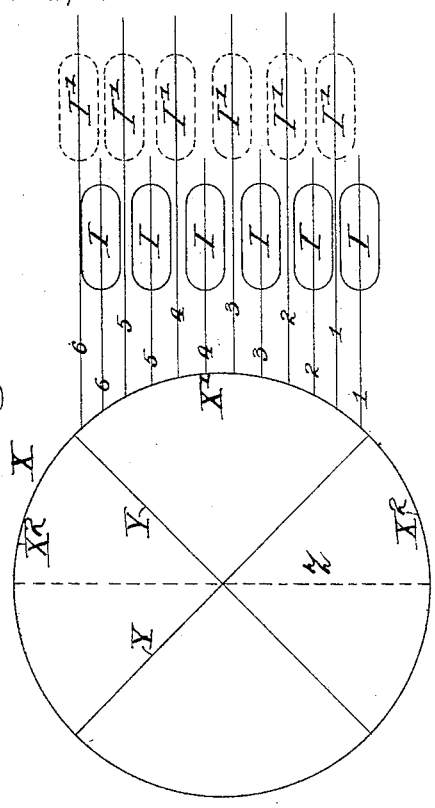
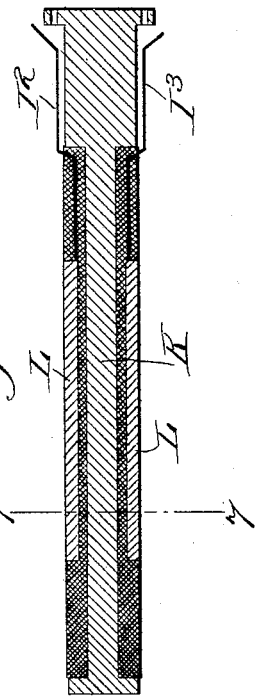
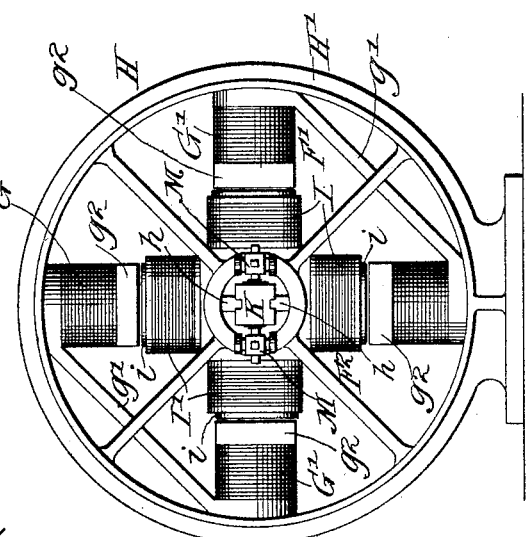
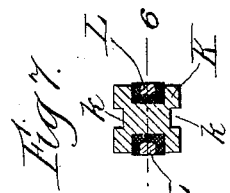
Witnesses  
Wm. F. Henning  
Wm. M. Rheem
Inventor  
Charles Clarence Poole (No Model.) 4 Sheets—Sheet 4.

C. C. POOLE.
ELECTRIC GENERATOR.

No. 581,366. Patented Apr. 27, 1897.

Witnesses
Wm. F. Henning
Xxx M. Rheem

Inventor
Charles Clarence Poole

THE NORRIS PETERS CO., PHOTO-LITHO., WASHINGTON, D. C.

United States Patent Office

CHARLES CLARENCE POOLE, OF EVANSTON, ILLINOIS.

ELECTRIC GENERATOR.

SPECIFICATION forming part of Letters Patent No. 581,366, dated April 27, 1897.

Application filed February 26, 1894. Serial No. 501,551. (No model.)

*To all whom it may concern:*

Be it known that I, CHARLES CLARENCE POOLE, of Evanston, in the county of Cook and State of Illinois, have invented certain new and useful Improvements in Electric Generators; and I do hereby declare that the following is a full, clear, and exact description thereof, reference being had to the accompanying drawings, and to the letters of reference marked thereon, which form a part of this specification.

This invention relates to a dynamo or electric generator in which the movable element or that part which is moved to generate the electric current is attached directly to and moves with the reciprocating piston of a steam or gas engine, or the corresponding reciprocating part of other prime mover.

In generators embracing a rotating movable part or element which is driven from the crank-shaft of a reciprocating engine the necessary uniformity of speed is produced by a balance-wheel or equivalent heavy masses of metal turning with the crank-shaft, by the inertia of which, notwithstanding the fact that the piston exerts pressure to turn the crank-shaft during a part only of the rotation thereof, a practically uniform speed in the rotating part of the generator is secured. This is true when the rotary part of the generator is driven by a belt from the shaft, and also when the shaft of the generator is coupled directly to the crank-shaft of the engine, it being usual in the latter case to employ an engine having a plurality of pistons acting on the same crank-shaft, and in which the cranks are set in angular relation with each other, so that one piston will be exerting its maximum effect when another piston is at the end of its stroke and is reversing its direction of movement. In either of such prior constructions a plurality of operating or working parts are interposed between the piston or other prime mover against which acts the steam or gas for driving the motor and the moving part of the generator, there being employed where a driving-belt is used at least a connecting-rod, a crank-shaft with a pulley thereon, a driving-shaft with a pulley thereon, and a driving-belt, and when the generator is coupled directly to the engine-shaft, a connecting-rod, crank-shaft, and driving-shaft.

As an improved means of generating electricity, I propose to employ an electric generator having a plurality of reciprocating parts or elements, and to connect said reciprocating parts by direct mechanical connections severally with the pistons of an engine or prime mover having a plurality of pistons which are connected with and act on a single crank-shaft, so that the reciprocating parts of the generator will partake of the movements of the pistons. I propose, furthermore, to so arrange each of said generator elements that it will operate to generate currents only during a part of the stroke of the piston to which it is attached, and to so arrange the said pistons and generator elements connected therewith that the generator elements will act successively or supplement each other in the production of current, so that while each piston and its connected generator element will produce current only part of the time, all of them acting together will generate current continuously—as, for instance, if two pistons connected with cranks arranged at right angles with each other on a common crank-shaft be employed the moving element of the generator connected with said piston will operate one-half of the time, or when the crank-shaft is performing one-half of a revolution. Each generator element in this case will operate during a quarter-revolution of the crank-shaft in the stroke of the piston in each direction, and will be idle during the reverse movement of the piston to which it is attached, or during the time the crank is passing the "dead-center" or moving in a direction transverse to the direction of motion of the piston. The two generator elements will, in a generator thus arranged, come into operation during successive quarters of the rotation of the crank-shaft, and will thus supplement each other—one being idle while the other is in action. Similarly, if an engine having three pistons be employed, each generator element will operate during one-sixth of the revolution of the crank-shaft, as the piston to which that element is attached makes its stroke in each direction, and the three elements will operate successively during successive sixths of the revolution of the crank-shaft, so as together produce a continuous action of the generator.

In order that a generator having a plurality of moving elements having reciprocatory motion, as described, may produce a current of constant period or period so nearly constant that the variations therein will be of no practical moment, I propose to employ such form of generating elements that each stroke of each movable element shall produce an electric impulse or impulses following impulses produced by the other elements at equal or practically equal intervals of time. Thus in a two-cylinder engine having two generator elements which act both in the backward and forward stroke of the pistons, if twenty impulses occur at each revolution of the crank-shaft, five impulses must be produced during each quarter-rotation of the shaft or during the movement of each generator element in each direction, and the interval between the last impulse produced by a stroke of one element and the first impulse produced by the stroke of the element which next comes into action must be equal to the intervals between the impulses produced during the movement of the said elements. Similarly, in case each generator element be arranged to produce a single impulse at each backward and forward stroke, as would be the case if the moving element consists of a coil which is carried from one magnetic field into another magnetic field of opposite polarity at each backward and forward stroke of the piston, no difficulty will arise in securing a current of constant period, because an impulse would be produced at each quarter-rotation of the crank-shaft, or four equidistant impulses during the complete rotation of the said shaft. In practice, however, the shaft would need to be driven at great speed to secure useful results when the impulses occurring in each rotation of the shaft are so few, and in the use of engines or motors made as now common better results will be produced by so arranging the stationary and moving parts of the generator that a plurality of impulses will be produced by the stroke of the reciprocating parts thereof in each direction. This result can easily be accomplished by so arranging the parts that the wire or coil in which the current is induced will be subject to several changes of polarity during each stroke of each of the moving parts of the generator or by moving several wires or coils relatively to a field magnet or magnets in such manner that the wires or coils will come successively into action—as, for instance, the moving part may be an armature having a U-shaped core with two exposed pole-pieces, and which is carried past several similar stationary field-magnet cores having wire coils thereon wound oppositely on alternate cores, so as to develop opposite polarity in said cores. In such a case an electric impulse will be produced in the armature-coils when the same pass from each field-magnet to the next one. If, however, the pole-pieces of the field-magnets in the case referred to or other parts the relative location of which determines the frequency of the impulses be placed at equal distances apart, the impulses will not occur at exactly equal intervals of time, because the speed of the reciprocating element of the generator is variable during its stroke, its speed being more rapid at the middle and of gradually lessening or increasing speed at the ends of the stroke. This variation of speed is of course due to the fact that the piston speed is controlled by the connection of the piston with the crank-shaft. In order, therefore, to secure a current of constant period, the field-magnets, armature-magnets, or other elements the distance apart of which determines the frequency of the impulses produced are separated by spaces or intervals of varying sizes, and those which come into action during the middle part of the stroke of the reciprocating part are separated by wider spaces than those which are in action at the ends of the stroke of said part. Inasmuch, however, as the reciprocating part of the generator is not in action at all, except in the middle part of its stroke, where its speed is nearly uniform, the variation in the width of the spaces separating said parts, which determines the frequency of the impulses, will not in practice be great. The proper distance apart of the coils or other parts may be arrived at by locating their centers at the same distances apart as the distances between parallel lines drawn through equidistant points on a circle representing the path of the crank-pin, as hereinafter fully explained.

By utilizing a part only of the stroke of each piston in the generation of current and arranging the several parts by which the frequency of the inductions or impulses is determined at varying distances apart, as described, I am enabled to construct a generator which will produce current of constant period and of any frequency of period desired. To illustrate, if five coils or generator elements be arranged to come into action at each stroke of each engine-piston in either direction, twenty impulses will be produced in each complete rotation of the engine-shaft, as in the instance above given, and if the shaft be turned at the rate of three hundred revolutions per minute, or five per second, the frequency of the inductions will be one hundred per second. The frequency may be increased either by an increase in the speed of the engine or by increasing the number of coils or elements which are brought into action during each stroke.

One among the many important advantages arising from the use of a structure in which an electric generator is provided with moving parts in direct mechanical connection with the engine-piston, so that the generator and prime mover constitute one structure, is that by this construction I avoid entirely the disadvantages and mechanical difficulties necessarily arising from the employment, for transmission of power from the prime mover to the moving element of the generator, of moving parts having surfaces in frictional contact with each other and subjected to heavy pressure. By the construction described, therefore, the life of the machine as a whole will not only be greatly prolonged, but expense of keeping the same in running order will be greatly diminished. Another advantage gained by my improvement is that each piston in the machine described does its work only during the effective part of the stroke and is relieved from work during its reverse movement occuring at the ends of its stroke, or when the crank on which it operates is passing the dead-center. The use is thus avoided of heavy balance-wheels or masses of metal heretofore used to carry the cranks past the dead-centers and thus maintain uniformity of speed, and great saving is thereby effected both in the weight of the structure and in the power expended, a large part of the energy required in generators as heretofore made to keep in motion the heavy masses of metal mentioned being saved.

To afford a better understanding of the features constituting my invention, I have shown in the accompanying drawings one form of apparatus in which my improvements may be embodied.

Figure 10:
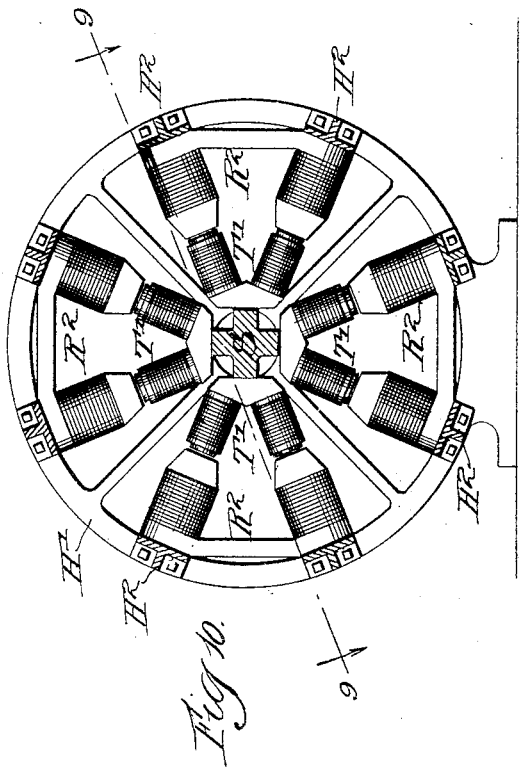

As shown in said drawings, Figure 1 is a plan view of an electric generator and its prime mover embodying my invention. Fig. 2 is a central vertical section, on a larger scale, of one of the parts or sections of the generator shown in Fig. 1, taken on line 2 2 of Fig. 3. Fig. 3 is a view in cross-section of the parts shown in Fig. 2, taken on line 3 3 of said Fig. 2. Fig. 4 is a detail view of one of the bars which carry the current-collecting strips or contact-pieces. Fig. 5 is an end view of the parts shown in Fig. 2. Fig. 6 is a longitudinal section of the bar shown in Fig. 4, taken on line 6 6 of Fig. 4. Fig. 7 is a cross-section of said bar, taken on line 7 7 of Fig. 6. Fig. 8 is a diagram illustrating a method of determining the distance apart of the armature-cores or pole-pieces. Fig. 9 is a sectional view of a single generator-section, showing a form of generator adapted for producing alternate currents, the same being taken on line 9 9 of Fig. 10. Fig. 10 is a cross-section taken on line 10 10 of Fig. 9.

As shown in the said drawings, A A indicate two steam-cylinders which are arranged side by side with their central axes parallel with each other and are provided with pistons B B and piston-rods B' B'.

C C indicate connecting-rods, through the medium of which motion is transmitted from the said piston-rods to a crank-shaft D, having two cranks D' D', arranged at right angles with each other, with which the rods C C are connected in the usual manner.

The steam-cylinders shown are of common form and are provided with the usual steam-chests $a\,a$, containing valves which are operated by eccentrics $a'$ on the crank-shaft. Said crank-shaft is shown as provided with a balance-wheel $D^2$. The engine will be provided with any common or preferred governing devices as well as other necessary accessories which it is not thought necessary to illustrate in the drawings.

Attached to the pistons B B are two rods E E, which extend through the rear ends or heads of the cylinders and serve to give motion to the moving parts of the electric generator, in this instance shown as consisting of two main parts or sections indicated as a whole by F F. Each of said generator-sections consists of an outer stationary part F' and an inner movable part $F^2$, which latter is connected with and actuated by one of the rods E. The parts or sections F F are alike and one only need be here described in detail. Referring now to one of the generator-sections—as, for instance, that shown in Figs. 2, 3, 4, and 5—the outer or stationary part F' consists of external field-magnets G G', which are supported in a suitable frame H, and interior armature-magnets I I', which are attached to a supporting or armature bar J, which is attached to and forms a prolongation of the rod E, the pole-pieces of the field and armature magnets being so disposed relatively to each other that they are carried or moved past each other without contact in the reciprocatory motion of the piston-rod.

To refer more particularly to the details of construction illustrated, the frame H consists of a metal casting or spider H' at the outer end of the section and horizontal frame-bars $H^2\,H^2$, extending from the spider H to the adjacent end of the cylinder-head and rigidly attached to the latter. The field-magnets G G' consist each of two cores $g\,g$, Fig. 3, arranged radially with reference to a line forming a prolongation of the cylinder-axis and a connecting-bar or yoke-piece $g'$. The said cores $g\,g$ are provided with pole-pieces $g^2\,g^2$, of elongated form, which face inwardly and extend longitudinally of the supporting-frame or parallel with the axial line of the cylinder. The said field-magnets in this instance comprise two sets, of which the set G G is located adjacent to the end of the cylinder, and the set G' G' is remote therefrom. Each set in the instance shown consists of two magnets, the magnet-cores $g\,g$ and the pole-pieces $g^2\,g^2$ thereof being arranged in alinement with each other, and being disposed at equidistant points about the frame H. Said field-magnets are so wound as to develop opposite polarity in the cores of the two sets of field-magnets, the field-magnets which form the set adjacent to the cylinder being wound alike, or so as to produce corresponding poles, and those remote from the cylinder being similarly wound alike, but so as to produce magnet-poles opposite to those of the other set.

The armature-magnets each consist of two cores $i\,i$, attached to a connecting-bar or yoke-piece and having pole-pieces or polar faces located opposite or arranged at the same angular distances apart as the pole-pieces of the field-magnets G and G', so that in the reciprocatory motion of the armature-bar, to which the said armature-magnets are attached, the pole-pieces of each magnet will be carried from the pole-pieces of one set of field-magnets to those of the other set, which are in alinement with the same. The armature-magnets are arranged side by side in longitudinal rows on the armature-bar J, the number of rows corresponding with the number of field-magnets in each set. In the drawings, for instance, two field-magnets are present in each set and a corresponding number of rows of armature-magnets are employed, those of one set being marked I and the other set I'. The elongated pole-pieces of the field-magnets are made of such length as to cover or embrace all of the armature-magnets in each set, and are so disposed that during the effective part of the stroke of the piston-rod in each direction all of the armature-magnets will be carried from beneath or opposite one field-magnet pole-piece past the intervening space separating the pole-pieces from each other to points opposite the adjacent pole-piece in alinement therewith. The result of this movement will be to reverse the polarity of the magnetism in each armature-magnet core $i$, it being obvious that when one armature-magnet is opposite one field-magnet a magnetic circuit will be completed through the field and opposing armature magnet, and when the latter is moved opposite the other field-magnet a magnetic circuit will be similarly formed, but the polarity of the armature-magnet will be reversed. All of the armature-magnets in each row are wound in the same manner or to produce corresponding polarity in all of the magnets in the same row, so that electric impulses produced by the movement of the several magnets from a magnetic field of one polarity into that of another will be in the same direction.

It follows from the above that in the reciprocatory motion of the bar electric impulses will be produced in the coils of the several armature-magnets, which impulses will follow each other in succession as the armature-magnets successively pass from one to the other of the two field-magnets past the spaces between them. If the field-magnet pole-pieces be arranged in line with each other circumferentially and the armature-magnets in the two rows opposite each other, then the electric impulses will be produced simultaneously in the two rows of magnets, but for a continuous-current generator I prefer to arrange the armature-magnets of the two rows in alternate order or with those of one row opposite the spaces between the other row, while retaining the pole-pieces of the field-magnets in circumferential alinement with each other, so that the armature-magnets of the two rows will act in alternation and the impulses produced in both rows will follow each other successively, with the result of multiplying the number of impulses produced in each stroke of the armature-magnets.

The armature-magnets are arranged in a space of such length and the field-magnets are placed at such distances apart that the armature-magnets will all be carried past the spaces between the field-magnets during the effective part of the stroke of the piston in each direction, and said parts are so arranged also that the armature-magnets of the two main parts or sections F F of the generator will supplement each other, the armature-magnet or one part of section being carried past the spaces between the field-magnets during the time the armature-magnets of the other section are at the ends of their stroke, this general result being secured by placing the crank-shafts of the engine at right angles with each other, while continuity of action in the two generator-sections is secured by so arranging or proportioning the parts that after all of the armature-magnets in one section have moved past the spaces between the field-magnets thereof those of the other section will begin to move past the spaces between the armature-magnets of that section. This result is secured in a generator having two parts, such as is shown, by so arranging the armature and field magnets of each section that all of the armature-magnets of one generator-section F will pass the spaces between the field-magnets during a time occupied by a quarter-revolution of the crank-shaft, so that in the operation of both generator-sections the armature-magnets thereof will be carried past the spaces between the field-magnets in succession and during alternate quarters of the revolution of the crank-shaft.

In the particular construction illustrated the field-magnets are placed at a distance apart from center to center approximately equal to the full stroke of the piston, and the parts are so arranged that all of the armature-magnets will pass over the spaces between the pole-pieces of the field-magnets during the time in which the crank-pin is making one-quarter of a revolution, it being obvious that in this construction the armature-magnets will, at the end of their stroke in either direction, be moved back and forth a short distance opposite the field-magnet pole-piece, which latter will preferably be made of such length that this movement will be accomplished without carrying any of the armature-magnets past the outer ends of the field-magnet pole-pieces, so that each armature-magnet will remain under the influence of the field-magnets and will retain the same polarity during the two quarters of the revolution of the crank-shaft when its direction of movement is being reversed. In other words, during the time the armature-magnets of one generator-section are accomplishing their effective movement in passing from one field-magnet to another one of opposite polarity the armature-magnets of the other generator-section will be moving merely a short distance along the pole-piece of the field-magnet opposite of which they are at the time located, and will therefore be idle and moving without any resistance by reason of the attractive force of the field-magnets. It follows that the movement of the armature-magnets from one magnetic field of force into another magnetic field of force of opposite polarity by which inductions or electrical impulses for generating current will be produced will occur during that part of the stroke of the actuating-piston in which said piston is moving most rapidly and in which the steam is acting thereon most efficiently, and it also follows that inasmuch as the moving parts of the two generator-sections operate in alternation each of the two pistons will accomplish its work or effective service during the middle parts of its stroke and will need to accomplish little or no work during the times when the crank-pin on which the piston acts is moving in a direction transverse to the piston-rod.

It is obvious that if the spaces between the armature-magnets described were equal the electrical impulses produced would not be of equal or uniform period, because the piston, by reason of its connection with the crank-shaft, moves more rapidly at the middle part of its stroke than at the ends thereof. I therefore locate the armature-magnets or the pole-pieces thereof at such unequal distances apart that they will pass over the space between the field-magnets at equal intervals of time, it being obviously necessary to secure this result that the middle or intermediate pole-pieces, which pass such spaces when the piston is moving at its greatest speed, should be located at a greater distance apart than the end or exterior ones, which pass over said spaces when the piston is near the opposite end of its stroke. By thus arranging the armature-magnets or their pole-pieces at varying distances apart I am able to secure a current of perfectly constant period, owing to the fact that the several armature-magnets of each generator-section thus arranged will pass from one field-magnet to the other at exactly equal intervals of time.

A simple means of determining the proper distances apart of the armature-magnets on the armature-rod J is indicated in the diagram Fig. 8, in which the circle X represents the path of the crank-pin, which is divided by lines Y Y, placed at right angles with each other, into quadrants, each representing a quarter-revolution of the crank-pin. Assuming that a vertical line Z represents the path of the piston, two opposite quadrants X' will indicate the path through which the crank-pin moves during those quarters of its rotation in which the piston moves most rapidly, while the intermediate quadrants $X^2$ $X^2$ will indicate the quarters of revolution of the crank-shaft when the piston is moving slowly and is reversing its direction of movement. By drawing lines 1, 2, 3, &c., at right angles to the line Z and parallel with each other on the quadrant X' the distances between said lines will indicate the distances apart which the armature-magnets must be located in order to pass the spaces between the field-magnets at equal intervals of time, there being as many points laid off in said quadrant as there are armature-magnets to be placed on the armature-rod. When there are two or more rows or sets of armature-magnets arranged to act in alternation with each other, the position of all of the said magnets will be determined in the same manner—as, for instance, the diagram shows an intermediate set of points, also numbered 1 2 3, &c., through which are drawn lines representing the distances apart of a second set of armature-magnets. The said diagram Fig. 8 also shows two sets of armature-magnets I I I and I' I' I' in proper location as to distances apart, as indicated by the diagram.

While I prefer to arrange the armature-magnets accurately in such relation to each other that they will pass the spaces between the field-magnets at exactly equal intervals of time, yet I do not consider that slight variation from such exactness in the location of said armature-magnets will in all cases be detrimental in practice, for the reason that when the periods occur at frequent intervals slight variations in the time between them would be too small to be noticeable—as, for instance, in case the current generated were used for electric lighting.

The electrical impulses produced in the several armature-magnets may be carried to line conductors, forming an electric-lighting or other circuit by any suitable arrangement of conductors or contact devices. I have shown in the drawings means of accomplishing this result as follows: Attached to the armature-rod J is a rod K, which forms a continuation thereof and is supported or guided at its outer end in the reciprocatory motion of the armature by means of guide-lugs $h\,h$ on the spider H', which lugs engage guide-grooves $k\,k$, formed in the upper and lower surfaces of the said bar K. Said bar K carries on either side an insulated contact-strip L, conveniently held in place by means of a body L' of insulating material placed within a longitudinal recess or groove formed in the said bar K in the manner shown. One terminal $i^2$ of each armature-magnet coil, Fig. 4, is connected by a conductor $l^2$ with one of the strips L, while the other terminal $i^3$ of each coil is connected with the other strip L by a conductor $l^3$.

Mounted on the spider H are two pivoted arms M M, carrying brushes $m\,m$, which are pressed against the sides of the bar K by springs $m'\,m'$. The said strips L L are made of length approximately equal to a distance through which the piston passes when the crank-pin is making its effective quarter-revolution in each direction, or, in other words, it is made of such length that the brushes will bear thereon during the time the armature-magnets are passing the spaces between the field-magnets, so that the current will be taken from the strips by said brushes at such time only. It will of course be seen that by this arrangement of the contact-strips and brushes the brushes belonging to one generator-section will be taking the current from the contact-strips thereof at the time when the brushes belonging to the other generator-section are free from the contact-strips of that section, the brushes moving or sliding over the insulated body beyond the ends of the said strips during the reverse movement of the pistons and armature-magnets in an obvious manner.

It is obvious that the electric impulses produced in the several armature-coils when the armature-magnets are moving in one direction will be opposite to or have a reverse sign from those produced when said magnets are moving in the opposite direction, and it therefore becomes necessary, in order to produce a continuous current, to rectify the same, which may be done by any suitable form of commutating device. I have herein shown a simple commutator for this purpose, which is mounted on the crank-shaft of the engine, as indicated at N. The commutator N is provided with two insulated collecting-strips $n\,n$ and four insulated commutator-strips $n'\,n'\,n^2\,n^2$, each extending through a quarter of the circumference of the commutator. Both collecting-strips $n\,n$ are connected with all of the segmental commutator-strips $n'\,n'\,n^2\,n^2$. O O' are two brushes bearing upon the collecting-strips $n\,n$ and connected with the brushes M M of both generator-sections by means of main and branch conductors P P $p\,p$. Other brushes Q Q are located in position to bear against both sets $n'\,n^2$ of the commutator-segments at diametrically opposite points of the commutator. Said brushes are connected with the supply and return wires of the electric light or other circuit. The commutator thus arranged will operate in a well-known manner to rectify the current produced by the movements of the several armature-magnets.

While a generator made as above described is adapted more particularly for producing continuous currents, yet it is obvious that the same general features of construction may be employed for producing alternating currents. To produce currents of the latter kind by an arrangement of field and armature magnets such as are herein shown, it will be desirable to arrange all of the magnets in circumferential alinement with each other, so that they will operate at the same time, and to increase the number of such armature-magnets for the purpose of obtaining the required frequency of period. Inasmuch, however, as the latter depends on the speed of the engine, it may be increased by driving the engine at a greater speed, and any actual increase in the number of armature-magnets over that herein shown may not in all cases be necessary—as, for instance, if the speed of an engine were as great as six hundred revolutions per minute or ten revolutions per second, and if each generator-section had six armature-magnets, inasmuch as all of the six magnets would produce one impulse in each quarter-revolution of the shaft, each full revolution of the shaft would give twenty-four impulses and a total of two hundred and forty periods per second could be secured, which would probably be sufficient for most purposes. In order in such a construction to secure a current of sufficiently high pressure, any required number of armature-magnets and corresponding field-magnets may be arranged around the armature-rod with the coils of the armature-magnets connected in series, as is common in such generators.

In Figs. 9 and 10 I have shown one generator-section arranged in a manner to produce an alternating current, but embodying the general features of construction hereinbefore described. In this instance the generator-section contains four sets R R' R² R³ of field-magnets, each set consisting of four magnets arranged circumferentially about the moving part of the generator-section and having their cores arranged radially, Fig. 10. These magnets are like the field-magnets shown in the other figures of the drawings. The armature-rod S in this case is provided with four sets T T' of armature-magnets, each set consisting of four magnets arranged in four separate rows, each row being arranged to coact with correspondingly-arranged field-magnets. The set T of armature-magnets operates in connection with the two sets R and R' of field-magnets, while the second set T' of armature-magnets operates in connection with the sets R² and R³ of the field-magnets, it being understood that the stroke of the engine is such as to move the armature-magnets a distance approximately equal to the distance apart of the field-magnets, so that the operation is the same as in the construction shown in the other figures of the drawings. In this case the armature-magnets of each set are arranged in circumferential alinement with each other, so that the several corresponding magnets in the several rows pass from one field-magnet to another at the same time. It will of course be understood that the armature-magnets of each set are arranged at unequal distances apart in order to secure uniformity of period, as hereinbefore described. In this case not only will electric impulses be produced in the corresponding armature-magnets of all of the rows in each set at the same time, but such impulses will occur at the same time in the corresponding magnets of all of the rows of both sets T T', so that, there being four rows of armature-magnets in each set, impulses will be produced in eight magnets simultaneously, and these magnets being all connected in series a current of corresponding tension will be produced. By increasing the number of rows of armature and field magnets in each set or by increasing the number of sets, or both, the number of simultaneously-acting magnets may be increased to give a current of any degree of tension or pressure desired.

The field-magnets in a generator of the character herein shown and described may be energized by means of the current generated or by a separate generator acting as an exciter, as heretofore common.

The electric generator illustrated is one only of a great number of different forms of generator which may be employed in carrying out the main features of my invention, by which is secured the result of obtaining a current of practically constant period by means of generator elements attached by direct mechanical connection and moving with the pistons of a steam-engine or other motor. Certain of the features of construction in the generator itself, however, in themselves are new and form part of my invention.

While the generator shown consists of two separate main parts or sections, yet this construction is not in all cases necessary, as the generator may be, in fact, a single structure having a plurality of moving parts or elements which are separately connected with pistons, and a single set of field-magnets may be arranged to operate in connection with a plurality of armature magnets or coils, or vice versa.

The employment of a plurality of double-acting engine-cylinders arranged side by side, as shown, is not essential in carrying out my invention, it being obvious that a plurality of engine-cylinders may be arranged in axial alinement with each other or otherwise, or a plurality of single-acting cylinders may be used or other form of engine may be employed with substantially the same results. Furthermore, the engine-cylinders may be arranged vertically instead of horizontally, and the moving generator elements may be rigidly connected with the pistons otherwise than by rods passing through the cylinder-heads—as, for instance, by attachment to the piston-rods either directly or by rigid cross pieces or yokes.

I claim as my invention—

1. The combination with a plurality of reciprocating prime movers subject to the action of steam or gas under pressure, of means in mechanical connection with said prime movers by which reverse movement thereof is caused to take place at equal intervals of time and an electric generator consisting of a plurality of generator-sections, the moving parts of which are severally in rigid mechanical connection with said prime movers, the moving part of each generator-section being located in such relation to the stationary part with which it coacts in the production of current as to produce electric inductions or impulses during the time said reciprocating part is moving through the middle part of its stroke only, substantially as described.

2. An electric generator consisting of a plurality of generator-sections having reciprocating moving parts and which act successively in the production of current, each of said generator-sections embracing a plurality of conductors or generator elements acting to produce a plurality of electric inductions or impulses during the middle part only of the stroke of the movable part in each direction, substantially as described.

3. The combination with a plurality of reciprocating prime movers subject to the action of a fluid under pressure, of means in mechanical connection with said prime movers by which reverse movement thereof takes place at equal intervals of time, and an electric generator consisting of a plurality of generator-sections having reciprocating moving parts which are severally in rigid mechanical connection with said prime movers, each of said generator-sections embracing a plurality of coils or generator elements acting to produce a plurality of electric impulses or inductions during the middle part only of the stroke of the said movable part of the generator-section in each direction, substantially as described.

4. An electric generator consisting of a plurality of generator-sections the moving parts of which have a reciprocatory motion and which act successively in the production of current, each of said generator-sections embracing a plurality of conductors or generator elements acting to produce a plurality of electric inductions or impulses during the middle part only of the stroke of the movable part in each direction, said conductors or generator elements being disposed at unequal distances apart to produce a current of constant period, substantially as described.

5. The combination with a plurality of prime movers subject to the action of steam or gas under pressure, of means in mechanical connection with said prime movers by which reverse movement thereof takes place at equal intervals of time, and a generator consisting of a plurality of generator-sections the moving parts of which are severally in rigid mechanical connection with the said prime movers, each of said generator-sections embracing a plurality of conductors or generator elements which are arranged in position to produce a plurality of electric inductions or impulses during the middle part only of the stroke in each direction of the said reciprocating part of the generator-section and which are disposed at unequal distances apart to produce such electric inductions or impulses at equal intervals of time, substantially as described.

6. The combination with a plurality of reciprocating prime movers subject to the action of steam or gas under pressure, and a crank-shaft having cranks with which the pistons or prime movers are severally connected, of a generator comprising a plurality of reciprocating parts which act successively in the operation of the generator, and each of which includes a plurality of conductors or generator elements which are adapted to produce a plurality of impulses during the stroke of the said reciprocating part of the generator in either direction, and which conductors or generator elements are disposed at unequal distances apart to produce electric impulses at substantially equal intervals of time, substantially as described.

7. An electric generator consisting of a plurality of generator-sections, having reciprocating moving parts and which act successively in the production of current, each of the said generator-sections embracing a plurality of sets of field-magnets and armature-coils, which latter are arranged in alternate or progressive order so that they will come into operation alternately and successively in the operation of the generator-section, substantially as described.

8. An electric generator comprising a plurality of generator-sections which operate periodically and successively each section having a reciprocatory moving part, and each embracing a plurality of sets of field-magnets and armature-coils, which are disposed at unequal distances apart and are arranged in alternate or progressive order, so that the field-magnets and armature-coils of the several sets will come into operation alternately and successively in the stroke of the moving part of the generator-section, substantially as described.

9. The combination, with a plurality of reciprocating prime movers subject to the action of steam or gas under pressure, of means in mechanical connection with said prime movers, by which reverse movement thereof takes place at equal intervals of time, and an electric generator comprising a plurality of generator-sections the movable part of which is rigidly connected with one of the said prime movers; each of said generator-sections embracing a plurality of sets of field-magnets and armature-coils which latter are arranged in alternate or progressive order, so that they will come into operation alternately and successively, in the operation of the generator-section, substantially as described.

10. The combination, with a plurality of engine-cylinders, of pistons within the cylinders, piston-rods attached to the pistons and extending through the cylinder-heads, a crank-shaft having cranks with which the said piston-rods are severally connected, an electric generator consisting of a plurality of generator-sections, each embracing a plurality of generator coils or elements and having a moving part, which is so located relatively to the stationary part of the generator-section with which it coacts as to be in operative relation thereto in the middle part of its stroke in each direction and during the period only when the other sections are not producing current, and rods attached to the pistons and extending through the rear ends or heads of the cylinders and severally connected with the said reciprocating parts of the generator, substantially as described.

11. The combination, with a plurality of reciprocating prime movers subject to the action of steam or gas under pressure, of a crank-shaft having cranks with which the said prime movers are severally connected, and a generator consisting of a plurality of generator-sections the moving parts of which are severally in rigid mechanical connection with said prime movers, said generator-sections each embracing a plurality of conductors or generator elements which are located at unequal distances apart and are so arranged as to act only during the middle part of the stroke of the moving part of the generator-section and current-collecting devices comprising reciprocating contact-strips attached to and moving with said reciprocating parts and brushes acting on said contact-strips, substantially as described.

12. The combination, with a plurality of reciprocating prime movers subject to the action of steam or gas under pressure, of means in mechanical connection with the said prime movers by which reverse movement thereof takes place at equal intervals of time, a generator consisting of a plurality of generator-sections which are severally in rigid mechanical connection with said prime movers, said generator-sections each embracing a plurality of coils or generator elements which are located at unequal distances apart and are arranged to act only during the middle part of the stroke of said moving part of the generator-section and a current-collecting device consisting of contact-strips which move with said reciprocating parts, brushes acting on said contact-strips, and a commutator for rectifying the current, substantially as described.

13. The combination with a plurality of prime movers subject to the action of steam or gas under pressure, of means in mechanical connection with the prime movers by which reverse movement thereof takes place at equal intervals of time, and a generator comprising a plurality of generator-sections, each section embracing two stationary field-magnets, and a reciprocating part which is in rigid mechanical connection with one of the said prime movers, and which carries a plurality of armature-coils, which latter are disposed at unequal distances apart and are so located relatively to the field-magnets, that they will all be carried from one field-magnet to the other during the middle part of the stroke of the reciprocating part and during the time when the other sections are not in action, substantially as described.

14. An electric generator, comprising a plurality of generator-sections, and each of which comprises two or more stationary field-magnets having opposite poles in alinement with each other, and a reciprocating armature-magnet embracing a plurality of magnet-cores the polar faces of which are located adjacent to the polar faces of the field-magnets, and a plurality of coils in which electric impulses are induced by bringing the pole-pieces opposite the poles of the two field-magnets in alternation, substantially as described.

15. The combination with a plurality of prime movers subject to the action of steam or gas under pressure, of a crank-shaft the cranks of which are severally connected with said prime movers, and a generator consisting of generator-sections provided with reciprocating parts which are severally connected with the said prime movers, said generator-sections embracing field-magnets of opposite polarity, and armature-magnets having cores the polar faces of which are adjacent to the polar faces of the field-magnets and which are brought into position to form magnetic circuits with the field-magnets in the movement of the said reciprocating parts, substantially as described.

In testimony that I claim the foregoing as my invention I affix my signature in presence of two witnesses.

CHARLES CLARENCE POOLE.

Witnesses:
ALBERT H. GRAVES,
WILLIAM L. HALL.